(12) United States Patent
Renau

(10) Patent No.: US 6,961,630 B1
(45) Date of Patent: *Nov. 1, 2005

(54) HYBRID MICROCONTROLLER SYSTEM AND METHOD

(75) Inventor: Karol Renau, Calabasas, CA (US)

(73) Assignee: Renau Corporation, Chatsworth, CA (US)

( * ) Notice: Subject to any disclaimer, the term of this patent is extended or adjusted under 35 U.S.C. 154(b) by 1 day.

This patent is subject to a terminal disclaimer.

(21) Appl. No.: 10/286,423

(22) Filed: Nov. 1, 2002

Related U.S. Application Data

(63) Continuation-in-part of application No. 09/927,915, filed on Aug. 10, 2001, now Pat. No. 6,636,772, which is a continuation of application No. 09/188,498, filed on Nov. 9, 1998, now abandoned, which is a continuation-in-part of application No. 08/857,551, filed on May 16, 1997, now Pat. No. 5,835,993.

(51) Int. Cl.⁷ ............................................. G05B 15/00
(52) U.S. Cl. ...................... 700/83; 700/17; 700/240; 700/14; 700/83; 700/84; 340/5.1; 708/131
(58) Field of Search ............... 700/17, 21, 83, 700/231, 239, 240, 241, 292, 293; 361/2, 361/13

(56) References Cited

U.S. PATENT DOCUMENTS

| | | | | |
|---|---|---|---|---|
| 4,802,051 A | * | 1/1989 | Kim ............................ | 361/13 |
| 4,937,703 A | * | 6/1990 | Adams ....................... | 361/187 |
| 5,027,284 A | * | 6/1991 | Senghaas et al. ........... | 700/240 |
| 5,129,548 A | * | 7/1992 | Wisniewski ................. | 222/16 |
| 5,596,348 A | * | 1/1997 | Hayakawa .................. | 345/823 |
| 5,601,218 A | * | 2/1997 | Takenaka .................... | 222/641 |
| 5,699,218 A | * | 12/1997 | Kadah ......................... | 361/13 |
| 5,835,993 A | * | 11/1998 | Renau ......................... | 318/778 |
| 5,950,870 A | * | 9/1999 | Takenaka .................... | 222/52 |
| 5,966,093 A | * | 10/1999 | Chapman ................ | 342/357.17 |
| 6,636,772 B1 | * | 10/2003 | Renau ......................... | 700/83 |

* cited by examiner

*Primary Examiner*—Anthony Knight
*Assistant Examiner*—Sunray Chang
(74) *Attorney, Agent, or Firm*—Fulwider Patton Lee & Utecht, LLP

(57) ABSTRACT

A hybrid microcontroller system for controlling a function of a device in an apparatus. The system controls the switching of the device so as to inhibit the formation of an abrupt transient spike between a pair of current switching contacts. Also, the system enables an operator from outside the system to enter a command relating to a function of the device, and for indicating to the operator outside the system the nature of the command thereof.

42 Claims, 3 Drawing Sheets

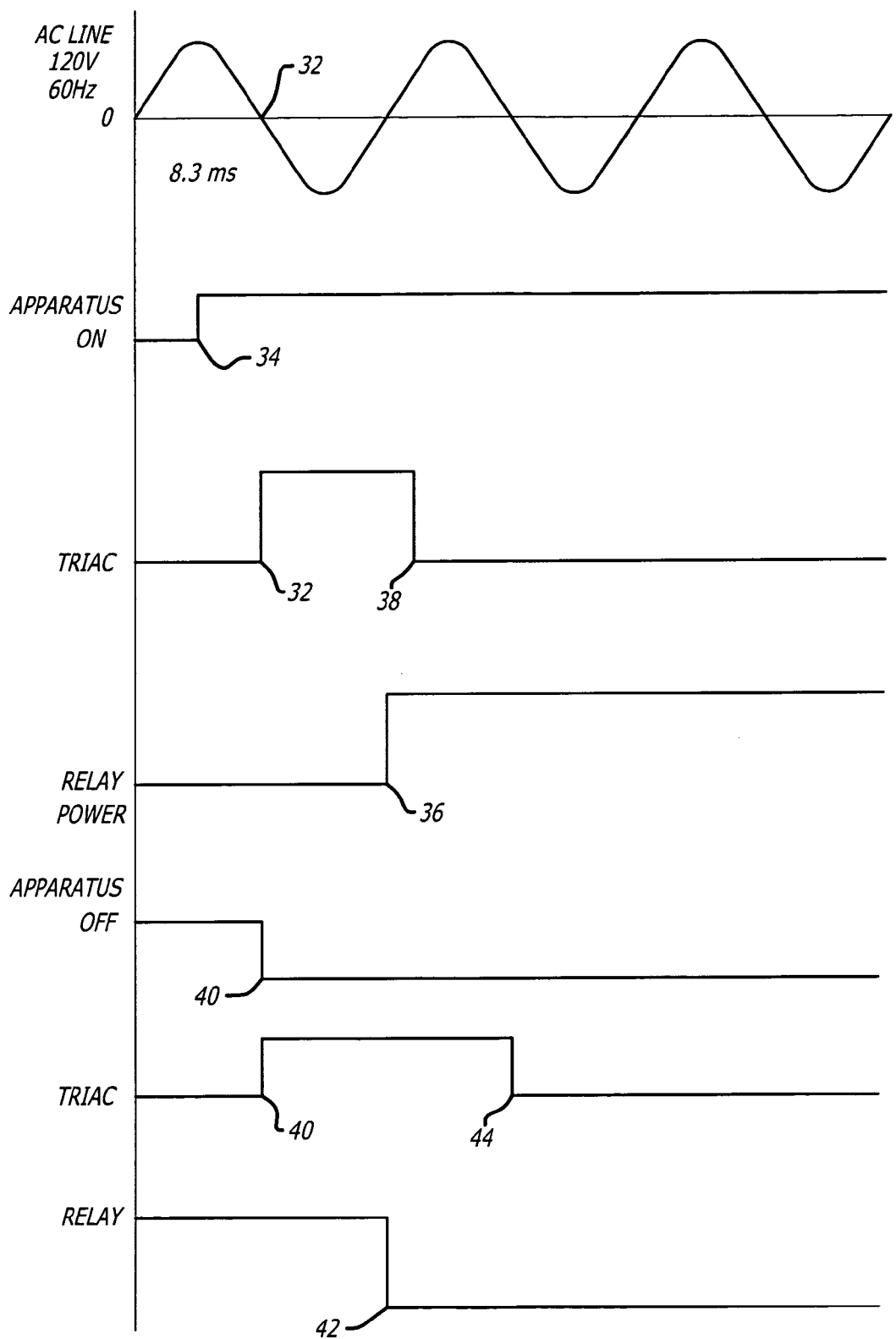

HYBRID MICROCONTROLLER SYSTEM AND METHOD

RELATED APPLICATIONS

This application is a continuation-in-part of application Ser. No. 09/927,915, filed Aug. 10, 2001, which issued as U.S. Pat. No. 6,636,772 on Oct. 21, 2003, which is a continuation of Ser. No. 09/188,498, filed Nov. 9, 1998, presently abandoned, which is a continuation-in-part of application Ser. No. 08/857,551, filed on May 16, 1997, which issued as U.S. Pat. No. 5,835,993 on Nov. 10, 1998.

BACKGROUND OF THE INVENTION

1. Field of the Invention

The present invention relates generally to control systems and methods, and, more particularly, to a hybrid microcontroller system for controlling a function of a device in an apparatus.

2. Description of the Related Art

A control system enables the control of the switching of a device responsive to entry of a command relating to a function of the device. Such systems may further enable an operator from outside the device to enter a command relating to a function of the device, and for indicating to the operator outside the device the nature of the command entered.

Control systems may enable the switching of a device by completing or breaking the path of current therein, and may enable an operator to modify the operating parameters of a device. Such systems may include a mechanical switch in a control element therein, wherein contacts are opened and closed to break or complete the current path. Such systems may also require access to the control element on the inside of the device for modifying device operational parameters. In a device such as a beverage dispensing machine wherein functions are controlled by a processor, for example, such control element may include a mechanical switch located inside the device, for enabling current switching and for adjusting attributes of the functions of the device. Such switch may control the operation of a heater for heating water in the beverage dispensing machine, in turning the heater on and off. In some implementations of a control system, an alphanumeric display on the outside of a processor-controlled devices enables control from the outside of the device of a processor located inside the device.

However, there have been problems associated with switching the current path and modifying the operating parameters in such control systems. Mechanical switch contacts are subject to generating abrupt transient spikes, resulting in corrosion, pitting, and disintegration of the contact surfaces over time, substantially reducing the electrical efficiency of the switch and the control element. Also, control elements located inside the device require inefficient access to the interior thereof, and are more time consuming and subject to causing damage in requiring access thereinto than a system which can be operated from outside the device without access thereinto. Also, an alphanumeric display and the associated keypads for operation thereof are relatively expensive to obtain, require a driver therefor, and require substantial power for the operation thereof.

Therefore, there has existed a need for a system which is capable of preventing abrupt transient spikes in a mechanical switch in a control element, which enables efficient device function-related command entry and indicating from outside the device, without access to the inside of the device, and which enables effective processing and implementation of entered and indicated parameter-modifying device commands. The present invention fulfills these needs.

SUMMARY OF THE INVENTION

Briefly, and in general terms, the present invention controls a function of a device by enabling control of the efficient switching of the device in response to entry of a device function-related command. It further enables effective entry of the command from outside the system, and indicating of the entered command outside the system, without requiring access to the interior of the system.

The system provides for enabling control of a function of a device in an apparatus, by enabling the switching of the device responsive to entry of a command relating to the function of the device. The system comprises a hybrid microcontroller. It includes a switch, which includes a pair of contacts, operable so as to close upon activation of the switch and open upon de-activation of the switch, subject to forming an abrupt transient spike between the pair of contacts upon operation of the switch, wherein the switch is connectable to the device upon activation thereof. Further, the system includes a spike-inhibiting element for inhibiting the forming of an abrupt transient spike between the pair of contacts upon operation of the switch, connected to the switch, able to activate the switch responsive to activation of the spike-inhibiting element. The system also includes a processing element, connected to the spike-inhibiting element for enabling the processing of a device function-related command, and the activation of the spike-inhibiting element responsive to the processing of the device function-related command, to close the connection of the switch to the device, to enable the device to execute the device function-related command from the processing element.

The system further includes a sub-system for enabling an operator from outside the system to enter a command relating to a function of the device, and for indicating to the operator outside the system the nature of the command entered, without operator access to the inside of the system. The sub-system includes at least one entry element, mounted on the system and connected to the processing element, for enabling an operator from outside the system to enter a command relating to a function of the device. Also, the sub-system includes at least one indicating element, mounted on the system and connected to the processing element, for indicating to the operator outside the system the nature of the command entered, adapted to interact with the entry element to respond to the actuation thereof. The processing element is able to process the command entered in the system responsive to the actuation of the entry element, for generating the actuation of the indicating element responsive thereto for indicating the nature of the command entered, and for interacting with the system to enable the device to perform the function responsive to the entry and indicating of the command.

Other features and advantages will become apparent from the following detailed description, taken in conjunction with the accompanying drawings, which describe and illustrate, by way of example, the features of the invention.

BRIEF DESCRIPTION OF THE DRAWINGS

FIG. 4 is a timing diagram of the operation of a hybrid microcontroller in accordance with the present invention.

DETAILED DESCRIPTION OF THE PREFERRED EMBODIMENTS

Figure 1:
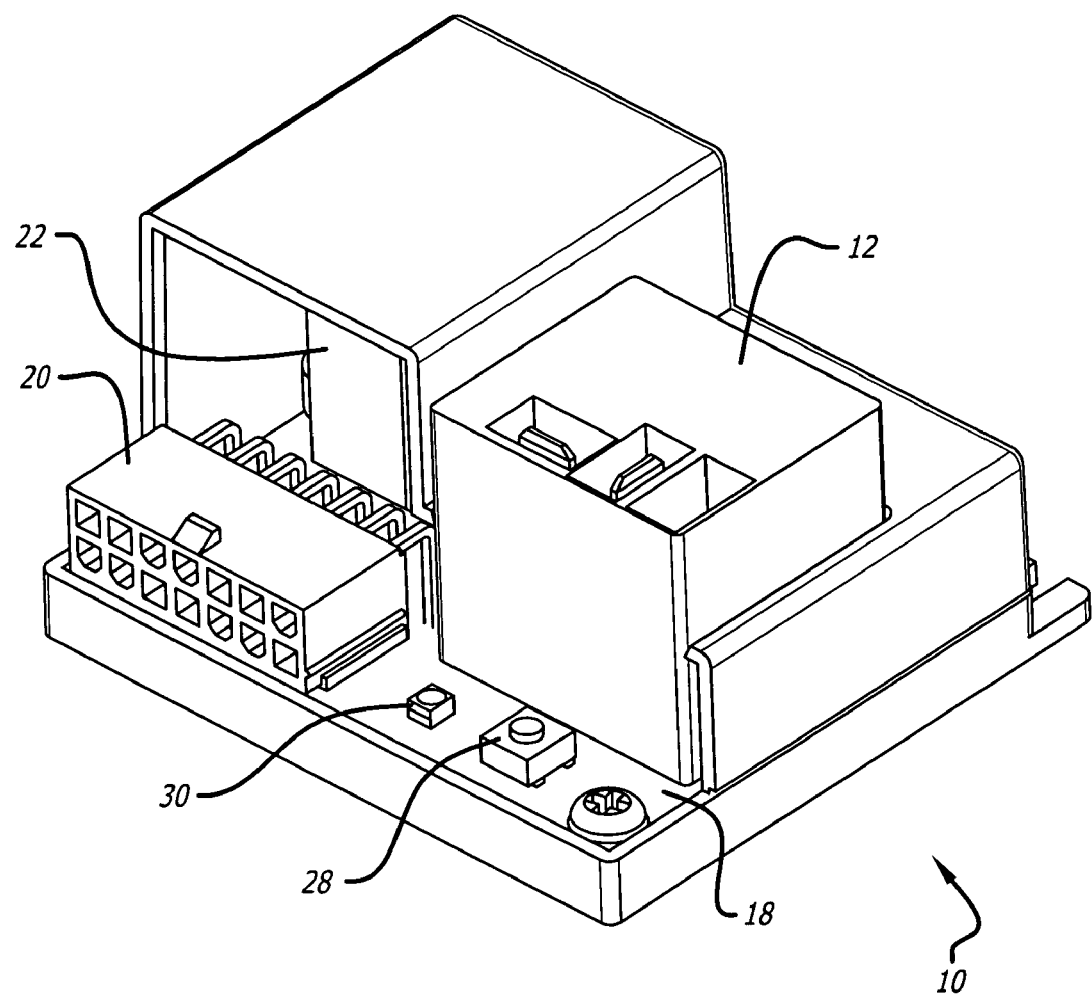
FIG. 1 is a perspective view of a hybrid microcontroller system in accordance with the present invention.
Figure 2:
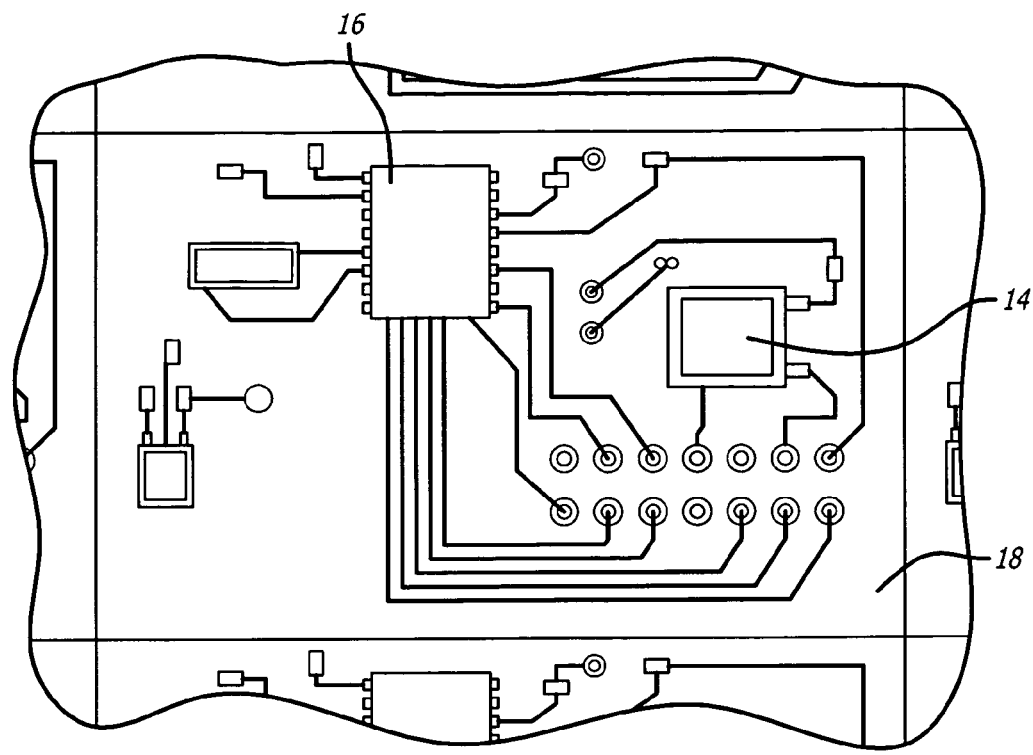
FIG. 2 is an elevational view of one side of a printed circuit board of a hybrid microcontroller in accordance with the present invention.
Figure 3:
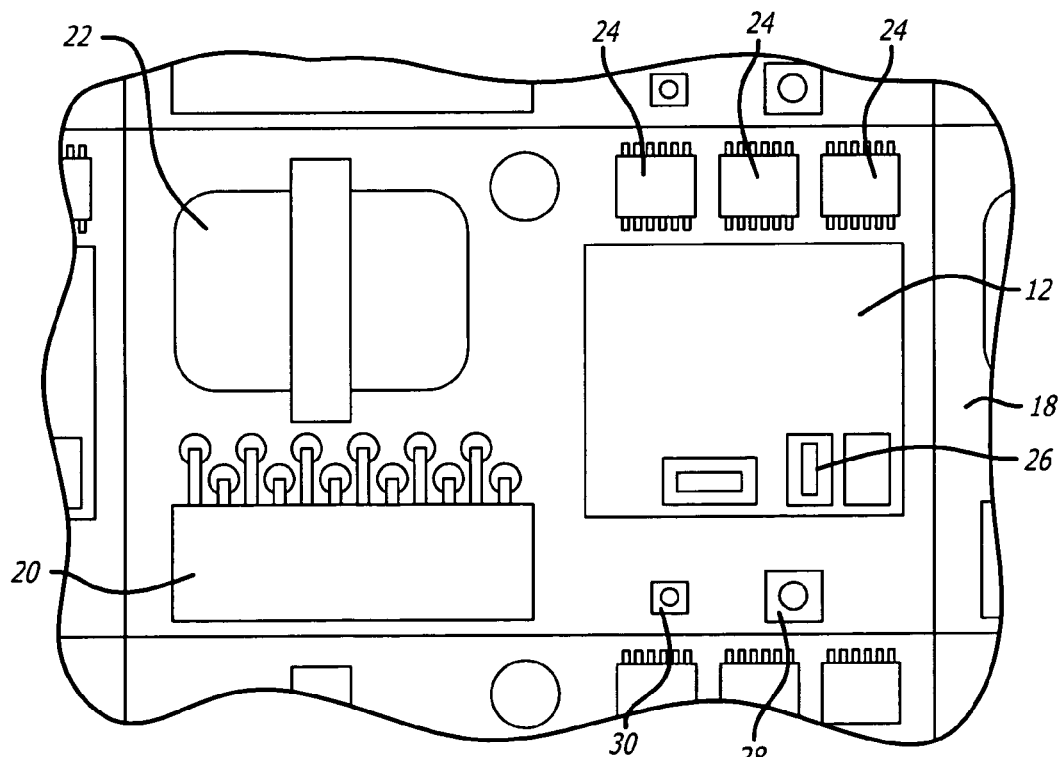
FIG. 3 is an elevational view of the other side of a printed circuit board of a hybrid microcontroller in accordance with the present invention.

Referring to the drawings, and in particular to FIGS. 1–3, there is shown a hybrid microcontroller system 10 for example for controlling a function of a device in an apparatus by switching the device responsive to entry of a command relating thereto. For example, the device may comprise a heater for heating water, in an apparatus which may comprise a coffeemaker which dispenses heated coffee by combining heated water with powdered coffee, and the function of the device controlled by the system 10 may comprise the turning on and off of the heater. The system 10 may comprise a module, which may be sealed.

The system 10 includes a switch 12, which is connectable to a device in an apparatus for controlling a function of the device. The switch 12 may be a mechanical switch, such as for example a relay. The switch 12 includes a pair of contacts therein. The contacts are operable so as to close upon activation of the switch 12 and open upon de-activation thereof. Operation of the switch 12 is subject to the forming of an abrupt transient spike between the pair of contacts, which could result in arcing between the contacts and pitting thereof over time after repeated uses as intended, interfering with the opening and closing of the switch 12, and substantially shortening the useful life thereof.

The system 10 further includes a spike-inhibiting element 14, for inhibiting the forming of an abrupt transient spike between the pair of contacts in the switch 12 upon operation thereof. The spike-inhibiting element 14 may be an electronic switch, for example a triac or a thyristor. It is connected to the switch 12, and activates the switch 12 responsive to activation thereof, so as to prevent arcing, pitting, and interference with the opening and closing of the switch 12, substantially increasing the useful life thereof.

Also, the system 10 includes a processing element 16, connected to the spike-inhibiting element 14. The processing element 16 enables the processing of a function-related command for the device. It also enables the activation of the spike-inhibiting element 14, responsive to the processing of the device function-related command, so as to open or close the connection of the switch 12 to the device. This enables the device to execute the device function-related command through the processing element 16.

The switch 12, the spike-inhibiting element 14, and the processing element 16 may be mounted on the opposed sides of a printed circuit board 18, as illustrated in FIGS. 2–3. The printed circuit board 18 may further include, mounted thereon, a connector 20, for enabling connections of elements thereto, a transformer 22, a series of opticouplers 24, and a connector 26 for enabling connection thereto of the device to be controlled by the system 10.

The system 10 further includes a sub-system, for enabling an operator from outside the system to enter a command relating to a function of the device, and for indicating to the operator outside the system the nature of the command entered, without operator access to the inside of the system. The function-related command for the device 12 may relate, for example, in an apparatus such as an automatic coffeemaker, to controlling the water temperature in the tank, and error codes for servicing the apparatus. The sub-system includes at least one entry element 28, mounted on the system 10 and connected to the processing element 16, for enabling an operator from outside the system 10 to enter a command relating to a function of the device 12. The entry element 28 may comprise a button which is able to be actuated in a preset actuation sequence, including a plurality of actuations thereof by the operator from outside the device. The preset actuation sequence of the entry element 28 may comprise a sequence for modifying operational parameters of the device 12. The entry element 28 may be mounted on the printed circuit board 18.

The sub-system also includes at least one indicating element 30, mounted on the system 10 and connected to the processing element 16, for indicating to the operator outside the system 10 the nature of the command entered. The indicating element 30 may comprise a light-emitting diode which interacts with the entry element 28 to respond to the actuation thereof. The indicating element 30 may comprise for example a single light emitting diode (LED), or three LEDs which each represent a particular portion of the indicated entry, such as for example numbers in ones, tens, and hundreds. The indicating element 30 is able to be actuated in a preset actuation sequence, including at least one actuation thereof responsive to actuation of the entry element, to indicate to the operator outside the device the nature of the command entered. The preset actuation sequence of the indicating element 30 may comprise a sequence for indicating the modifying of operational parameters of the device 12. The indicating by the indicating element 30 of the preset actuation sequence of the indicating element 30 may comprise a preset series of pulses of light, and each such series of light pulses may correspond to the nature of an entered command. The indicating element 30 is preferably located proximate the entry element 28. The indicating element 30 may also be mounted on the printed circuit board 18.

The processing element 16 processes the command entered in the system 10 responsive to the actuation of the entry element 28, for generating the actuation of the indicating element 30 responsive thereto for indicating the nature of the command entered, and for interacting with the system 10 to enable the device 12 to perform the function responsive to the entry and indicating of the command. The processing element 16 includes instructions programmed therein for enabling entry of the command therein upon actuation thereof. The programmed instructions further enable actuation of the indicating element 30 for indicating the modifying of operational parameters of the device responsive to the entry of the command therein. The processing element 16 preferably comprises a microprocessor.

The entry element 28 preferably comprises a push button, connected to the processing element 16. The indicating element 30 preferably comprises a light emitting diode, connected to the processing element 16. The command which is able to be entered in the processing element 16 through the entry element 28 may relate to accessing and modifying operational parameters of the device. The command which is indicated by the indicating element 30 may relate to the modifying of operational parameters of the device.

The system 10 may further include a housing, wherein the switch 12, the spike-inhibiting element 14, and the processing element 16 are enclosed. The housing may be sealed, as by an encapsulating epoxy.

As shown in FIGS. 1–3, in a method for example for the use of the system 10, the system 10 enables control of a function of a device in an apparatus, by enabling the switching of the device responsive to entry of a command relating to the function of the device. The switch 12, the spike-inhibiting element 14, and the processing element 16 may be enclosed in a housing, which may be sealed. The switch 12, which may comprise a mechanical switch such as a relay, is activated responsive to activation of the spike-inhibiting element 14, which may comprise an electronic switch such as thyristor, so as to inhibit the forming of an abrupt transient spike between the pair of contacts in the switch 12, and so as to close the connection of the switch 12 to the device, to enable the device to perform the device function-related command from the processing element 16. The processing element 16 is activated so as to process a device function-related command, including activating the spike-inhibiting element 14 responsive thereto.

As seen in the timing diagrams in FIG. 4, for example, the AC line into the apparatus may constitute a 120 volt, 60 cycles per second line. The half-wave crossing "zero" point of the line current may take place at the time at point 32, which may comprise about 8.3 milliseconds. The apparatus may initially be switched on at the time at point 34. Thereafter, the triac 14 turns on at the "zero" crossing point at the time at point 32. The relay 12, which is off when the triac 14 turns on, is turned on at the time at point 36. After the relay 12 turns on, the triac 14 turns off at the time at point 38. The apparatus may subsequently be switched off at the time at point 40, after the triac 14 turns off at the time at point 38. The triac 14 then turns on at the time at point 40. Thereafter, the relay turns on at the time at point 42, after the time at point 40, and the triac 14 turns off at the time at point 44.

A command, which may relate to accessing and modifying operational parameters of the device, is entered by an operator from outside the device which is in the apparatus, which command relates to a function of the device. The command is entered through the entry element 28, which may comprise a push button, and which may be actuated in a preset actuation sequence. The command is processed in the processing element 16 in the device, which processing element 16 may comprise a microprocessor, and which includes instructions programmed therein for enabling entry of the command therein upon actuation thereof. The command is processed responsive to entry of the command through the entry element 28. The nature of the command entered is indicated to the operator outside the device through the indicating element 30, which may comprise a light-emitting diode, and which may be located proximate the entry element 28. The command is indicated responsive to processing thereof in the processing element 16, which indicating element 30 may be actuated in a preset actuation sequence. The preset actuation sequence may comprise a preset series of light pulses corresponding to the nature of the entered command.

While the system 10 has been shown and described in connection with controlling a function of a device in an apparatus, it may alternatively control other functions of other devices in other apparatuses.

From the foregoing it will be appreciated that the system of the present invention provides advantages in controlling a function of a device in an apparatus to inhibit abrupt transient spikes between a pair of contacts in a mechanical switch such as a relay. While several particular forms of the invention have been illustrated and described, it will be apparent that various modification can be made without departing from the spirit and scope of the invention. Accordingly, the invention is not to be limited, except as by the following claims.

What is claimed is:

1. A system for enabling control of a function of a device in an apparatus, by enabling the switching of the device responsive to entry of a command relating to the function of the device, wherein the system comprises a hybrid microcontroller, comprising:

a switch, which includes a pair of contacts, adapted to be operable so as to close upon activation of the switch and open upon de-activation of the switch, subject to forming an abrupt transient spike between the pair of contacts upon operation of the switch, wherein the switch is connectable to the device upon activation thereof;

a spike-inhibiting element for inhibiting the forming of an abrupt transient spike between the pair of contacts upon operation of the switch, connected to the switch, adapted to activate the switch responsive to activation of the spike-inhibiting element; and a processing element, connected to the spike-inhibiting element for enabling the processing of a device function-related command, and the activation of the spike-inhibiting element responsive to the processing of the device function-related command to close the connection of the switch to the device to enable the device to execute the device function-related command from the processing element.

2. The system of claim 1, further comprising a sub-system for enabling an operator from outside the system to enter a command relating to a function of the device, and for indicating to the operator outside the system the nature of the command entered, without operator access to the inside of the system, comprising at least one entry element, mounted on the system and connected to the processing element, for enabling an operator from outside the system to enter a command relating to a function of the device, and at least one indicating element, mounted on the system and connected to the processing element, for indicating to the operator outside the system the nature of the command entered, adapted to interact with the entry element to respond to the actuation thereof, wherein the processing element is adapted to process the command entered in the system responsive to the actuation of the entry element, for generating the actuation of the indicating element responsive thereto for indicating the nature of the command entered, and for interacting with the system to enable the device to perform the function responsive to the entry and indicating of the command.

3. The system of claim 1, wherein the switch comprises a mechanical switch.

4. The system of claim 1, wherein the spike-inhibiting element comprises an electronic switch.

5. The system of claim 1, further comprising a housing wherein the switch, the spike-inhibiting element, and the processing element are enclosed.

6. The system of claim 2, wherein the entry element is adapted to be actuated in a preset actuation sequence, including at least one actuation thereof by the operator from outside the device.

7. The system of claim 2, wherein the indicating element is adapted to be actuated in a preset actuation sequence, including at least one actuation thereof responsive to actuation of the entry element, to indicate to the operator outside the device the nature of the command entered.

8. The system of claim 2, wherein the processing element comprises a microprocessor.

9. The system of claim 2, wherein the entry element comprises a push button, connected to the processing element.

10. The system of claim 2, wherein the indicating element comprises a light emitting diode, connected to the processing element.

11. The system of claim 2, wherein the command adapted to be entered in the processing element through the entry element relates to accessing and modifying operational parameters of the device.

12. The system of claim 2, wherein the command indicated by the indicating element relates to the modifying of operational parameters of the device.

13. The system of claim 2, wherein the indicating element is located proximate the entry element.

14. The system of claim 2, wherein the processing element includes instructions programmed therein for enabling entry of the command therein upon actuation thereof.

15. The system of claim 3, wherein the mechanical switch comprises a relay.

16. The system of claim 4, wherein the electronic switch comprises a thyristor.

17. The system of claim 5, wherein the preset actuation sequence of the entry element comprises a sequence for modifying operational parameters of the device.

18. The system of claim 6, wherein the preset actuation sequence of the indicating element comprises a sequence for indicating the modifying of operational parameters of the device.

19. The system of claim 13, wherein the programmed instructions further enable actuation of the indicating element for indicating the modifying of operational parameters of the device responsive to the entry of the command therein.

20. The system of claim 14, wherein the housing is sealed.

21. The system of claim 18, wherein the indicating by the indicating element of the preset actuation sequence of the indicating element comprises a preset series of pulses of light, and each such series of light pulses corresponds to the nature of an entered command.

22. A method of enabling control of a function of a device in an apparatus, by enabling the switching of the device responsive to entry of a command relating to the function of the device, in a system which comprises a hybrid microcontroller, comprising a switch, which includes a pair of contacts, adapted to operable so as to close upon activation of the switch and open upon de-activation of the switch, subject to forming an abrupt transient spike between the pair of contacts upon operation of the switch, wherein the switch is connectable to the device upon activation thereof, a spike-inhibiting element for inhibiting the forming of an abrupt transient spike between the pair of contacts upon operation of the switch, connected to the switch, adapted to activate the switch responsive to activation of the spike-inhibiting element; and a processing element, connected to the spike-inhibiting element for enabling the processing of a device function-related command, and the activation of the spike-inhibiting element responsive to the processing of the device function-related command to close the connection of the switch to the device to enable the device to execute the device function-related command from the processing element, wherein the method comprises:
    activating the processing element so as to process a device function-related command, including activating the spike-inhibiting element responsive thereto; and
    activating the switch responsive to activation of the spike-inhibiting element, so as to inhibit the forming of an abrupt transient spike between the pair of contacts in the switch, and so as to close the connection of the switch to the device to enable the device to perform the device function-related command from the processing element.

23. The method of claim 22, further comprising a subsystem for enabling an operator from outside the system to enter a command relating to a function of the device, and for indicating to the operator outside the system the nature of the command entered, without operator access to the inside of the system, comprising at least one entry element, mounted on the system and connected to the processing element, for enabling an operator from outside the system to enter a command relating to a function of the device, and at least one indicating element, mounted on the system and connected to the processing element, for indicating to the operator outside the system the nature of the command entered, adapted to interact with the entry element to respond to the actuation thereof, wherein the processing element is adapted to process the command entered in the system responsive to the actuation of the entry element, for generating the actuation of the indicating element responsive thereto for indicating the nature of the command entered, and for interacting with the system to enable the device to perform the function responsive to the entry and indicating of the command, and further comprising entering a command from outside the device relating to a function of the device through the entry element, processing the command in the processing element in the device responsive to entry of the command through the entry element, and indicating to the operator outside the device through the indicating element the nature of the command entered, responsive to processing thereof in the processing element.

24. The method of claim 22, wherein the switch comprises a mechanical switch, and wherein activating the switch comprises activating the mechanical switch.

25. The method of claim 22, wherein the spike-inhibiting element comprises an electronic switch, and wherein activating the spike-inhibiting element comprises activating the electronic switch.

26. The method of claim 22, further comprising a housing wherein the switch, the spike-inhibiting element, and the processing element are enclosed, further comprising enclosing the switch, the spike-inhibiting element, and the processing element in the housing.

27. The method of claim 23, wherein the entry element is adapted to be actuated in a preset actuation sequence, including at least one actuation thereof by the operator from outside the device, and wherein entering a command further comprises actuating the entry element in a preset actuation sequence.

28. The method of claim 23, wherein the indicating element is adapted to be actuated in a preset actuation sequence, including at least one actuation thereof responsive to actuation of the entry element, to indicate to the operator outside the device the nature of the command entered, and wherein indicating the nature of the command entered further comprises actuating the indicating element in a preset actuation sequence.

29. The method of claim 23, wherein the processing element comprises a microprocessor, and wherein activating the processing element comprises activating the microprocessor.

30. The method of claim 23, wherein the entry element comprises a push button, connected to the processing element, and wherein entering a command comprises activating the push button from outside the device.

31. The method of claim 23, wherein the indicating element comprises a light emitting diode, connected to the processing element, and wherein indicating the nature of the command entered comprises activating the light emitting diode to indicate to the operator outside the device.

32. The method of claim 23, wherein the command adapted to be entered in the processing element through the entry element relates to accessing and modifying operational parameters of the device, and wherein entering a command comprises entering a command relating to assessing and modifying operational parameters of the device.

33. The method of claim 23, wherein the command indicated by the indicating element relates to the modifying of operational parameters of the device, and wherein indicating the nature of the command entered comprises indicating the modifying of operational parameters of the device.

34. The method of claim 23, wherein the indicating element is located proximate the entry element, and wherein indicating the nature of the command entered comprises indicating thereof proximate the entry element.

35. The method of claim 23, wherein the processing element includes instructions programmed therein for enabling entry of the command therein upon actuation thereof, and wherein processing the command comprises activating the instructions programmed in the processing element.

36. The method of claim 24, wherein the mechanical switch comprises a relay, and wherein activating the mechanical switch comprises activating the relay.

37. The method of claim 25, wherein the electronic switch comprises a thyristor, and wherein activating the electronic switch comprises activating the thyristor.

38. The method of claim 26, wherein the preset actuation sequence of the entry element comprises a sequence for modifying operational parameters of the device, and wherein entering the command further comprises actuating the entry element in a preset actuation sequence for modifying operational parameters of the device.

39. The method of claim 27, wherein the preset actuation sequence of the indicating element comprises a sequence for indicating the modifying of operational parameters of the device, and wherein indicating the nature of the command entered comprises actuating the indicating element in a preset actuation sequence for indicating the modifying of operational parameters of the device.

40. The method of claim 34, wherein the programmed instructions further enable actuation of the indicating element for indicating the modifying of operational parameters of the device responsive to the entry of the command therein, and wherein actuating the programmed instructions comprises actuating the indicating element.

41. The method of claim 35, wherein the housing is sealed, further comprising sealing the housing.

42. The method of claim 39, wherein the indicating by the indicating element of the preset actuation sequence of the indicating element comprises a preset series of pulses of light, and each such series of light pulses corresponds to the nature of an entered command, and wherein indicating the nature of the command entered further comprises actuating the indicating element in a preset actuation sequence comprising a series of light pulses.

* * * * *